United States Patent [19]

McGuffie

[11] Patent Number: 4,533,263
[45] Date of Patent: Aug. 6, 1985

[54] RADIAL BEARING AND BI-DIRECTIONAL THRUST BEARING ARRANGEMENT

[75] Inventor: Michael J. McGuffie, Harwinton, Conn.

[73] Assignee: The Torrington Company, Torrington, Conn.

[21] Appl. No.: 535,762

[22] Filed: Sep. 26, 1983

[51] Int. Cl.³ .......................... F16C 19/10; F16C 19/49
[52] U.S. Cl. ..................................... 384/454; 384/613; 384/615
[58] Field of Search ............... 308/176, 174, 233, 232, 308/175, 230; 384/454, 613, 615

[56] References Cited

U.S. PATENT DOCUMENTS

| | | | |
|---|---|---|---|
| 2,941,853 | 6/1960 | Bartholomäus | 308/233 |
| 3,721,503 | 3/1973 | Johnson | 308/174 |
| 4,382,639 | 5/1983 | McGuffie | 308/233 |
| 4,431,236 | 2/1984 | Orain | 308/174 |

Primary Examiner—Lenard A. Footland
Attorney, Agent, or Firm—Frank S. Troidl

[57] ABSTRACT

A radial roller bearing and a bi-directional ball bearing are mounted in the annular space separating a rotatable outer member and a stationary inner member. The bi-directional ball bearing has a pressed metal cup with a radially extending end flange. Balls and at least one thrust plate is provided in the metal cup.

The dimensions and locations of the cup, balls, and thrust plates are such that an axial force on the pressed metal cup in a predetermined axial direction causes the end flange to come into contact with either the balls or a thrust plate, depending on their axial locations within the cup, and an axial force in the other axial direction causes the end flange to break such contact.

7 Claims, 5 Drawing Figures

RADIAL BEARING AND BI-DIRECTIONAL THRUST BEARING ARRANGEMENT

This invention relates to anti-friction bearings. More particularly, this invention is a bearing arrangement which will absorb loads in a radial direction and also absorb thrust loads from either direction.

Though the radial bearing and bi-directional thrust bearing arrangement of this invention may be used in different types of apparatus, it is particularly useful in an automotive air-conditioner compressor which is clutched at the input pulley. An anti-friction clutch pulley bearing must carry radial and axial loads, have a minimum end play, be capable of handling high speed and high temperature, be sealed, and give long life without relubrication.

Briefly described, the invention is a radial bearing and bi-directional thrust bearing arrangement which includes an inner-annular race, and a rotatable outer member having an inside diameter larger than the outside diameter of the inner-annular race to provide an annular space. A radial roller bearing is mounted in the annular space. A bi-directional ball bearing is also mounted in the annular space. The ball bearing has a pressed metal cup with a radially extending end flange. A thrust washer mounted adjacent to the other end of the metal cup extends radially inwardly toward the inner-annular race. Balls, and at least one thrust plate are located in the metal cup. The number of thrust plates and the dimensions of the cup, thrust washer, balls, and thrust plates are such that an axial force on the metal cup in one axial direction causes the end flange to come into contact with either balls or a thrust plate, depending on whether the balls or a thrust plate is adjacent. A thrust path is formed from the end flange through the balls and thrust plate arrangement. An axial force on the metal cup in the other axial direction causes the thrust washer to contact either balls or a thrust plate, depending on whether the balls or a thrust plate is adjacent. A thrust path is formed from the thrust washer through the balls and thrust plate arrangement.

In addition to the combination of the radial bearing and bi-directional thrust bearing being novel, the bi-directional thrust being itself is novel. The bi-directional thrust bearing includes an outer race having an end flange at one end and a thrust washer adjacent the other end. Balls and at least one thrust plate are located in the outer race. The number of thrust plates, and the dimensions of the outer race, balls, thrust washer, and thrust plates are such that an axial force on the outer race in one direction causes the outer race end flange to contact the adjacent member in the outer race. The adjacent member may be either the balls, or a thrust plate, depending on the embodiment of the invention desired. An axial force on the outer race in the other axial direction causes the thrust washer to contact either the balls, or a thrust plate, depending on the desired embodiment.

The invention, as well as its many advantages, may be further understood by reference to the following detailed description and drawings in which.

Figure 4:
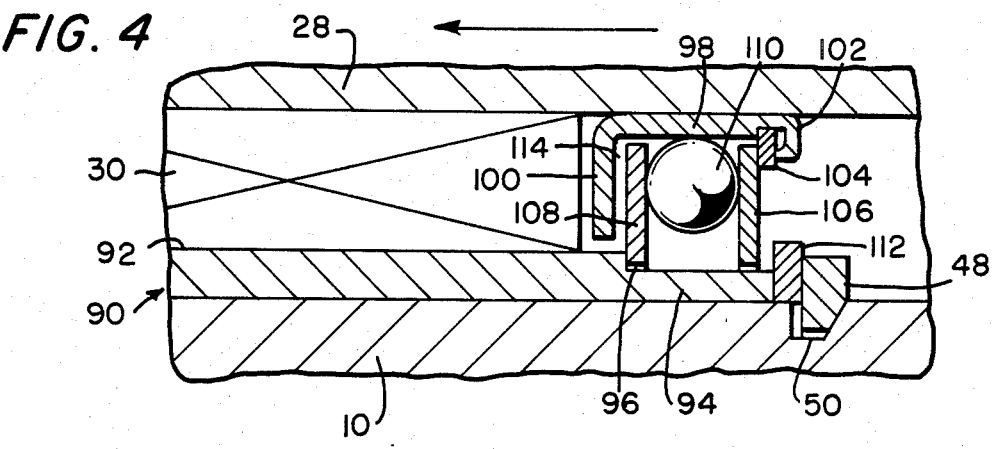
Figure 5:
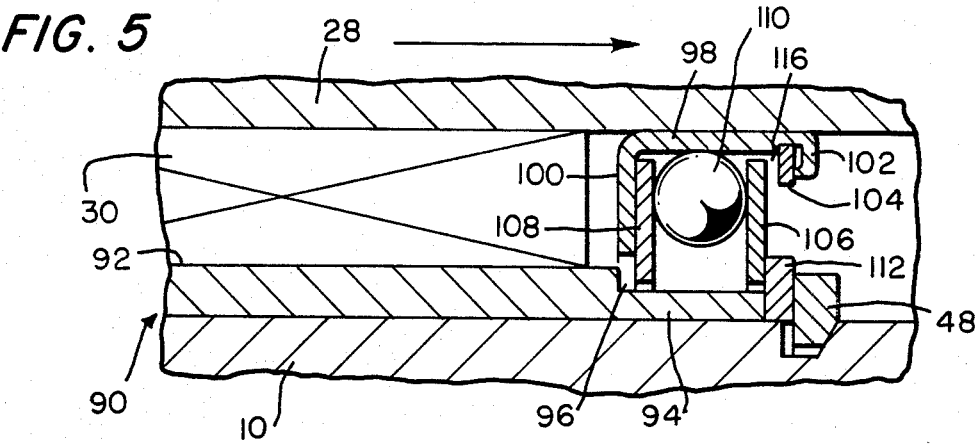

FIG. 4 is an elevational view, partly in section, showing a second preferred embodiment of the bi-directional thrust bearing showing the positions of the parts of the bearing when a thrust load is exerted to the left looking at the figure; and FIG. 5 is a view similar to FIG. 4 showing the positions of the parts of the bi-directional thrust bearing when a thrust is exerted to the right looking at the figure.

Throughout the various figures, like parts are referred to by like numbers.

Figure 1:
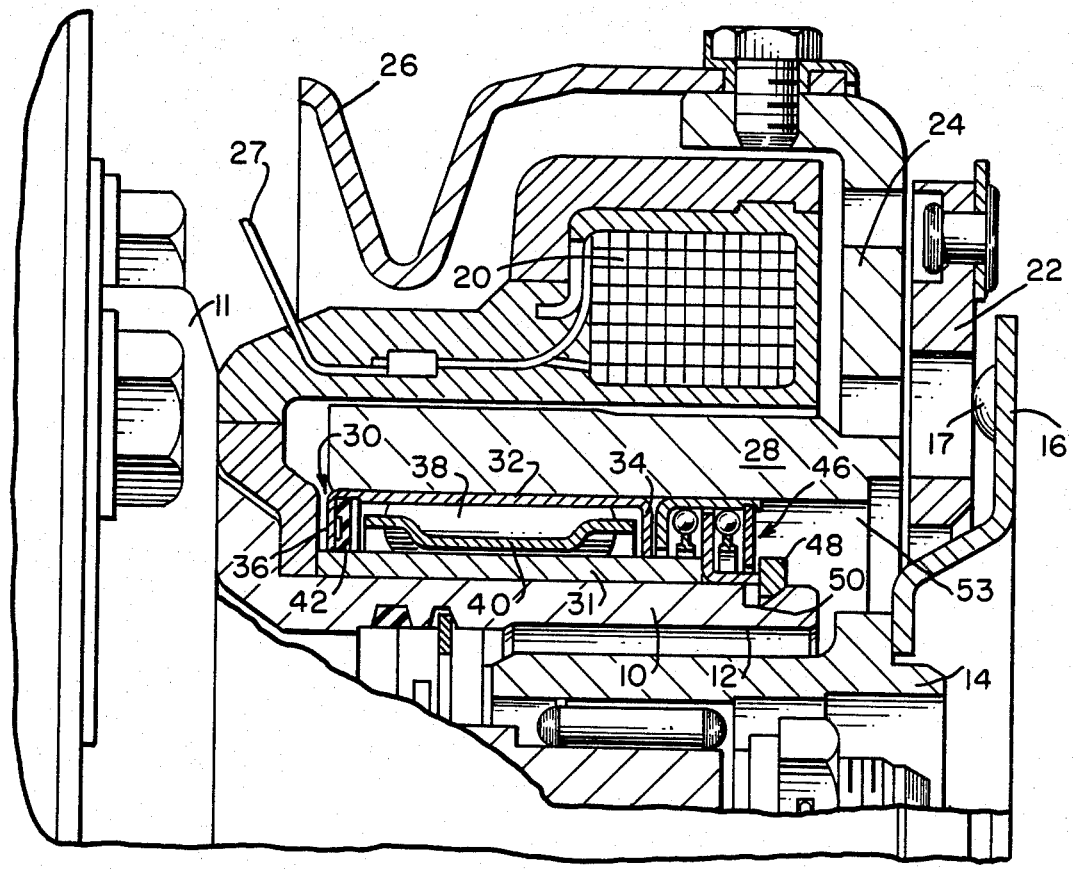
FIG. 1 is an elevational view, partly in section, showing the new radial bearing and bi-directional thrust bearing arrangement supporting an automotive air-conditioning clutch pulley.

Referring to the drawings and more particularly to FIG. 1, there is shown a stationary shaft 10 mounted on bracket 11 and having a central bore 12. An electromagnetic circuit includes magnetic member 16 with button 17. Magnetic member 16 is attached to rotatable shaft 14 in bore 12. The electromagnetic circuit also includes magnetic member 22, magnetic member 24 attached to pulley 26, and electromagnetic coil 20. An electric current through lines 27 and electromagnetic coil 20 activates elements 16, 17, and 22 so that magnetic member 22 is pulled into contact with magnetic member 24 to rotate magnetic member 24. A hub 28 extends longitudinally from the inside diameter of the annular magnetic member 24. When the automobile motor is running, pulley 26 continuously rotates so the hub 28 can rotate about the stationary shaft 10.

A drawn cup roller radial bearing 30 is used to anti-frictionize the radial load component. The radial bearing 30 is pressed into the housing and is slip fit on heavy wall inner ring 31. The bearing 30 includes a drawn cup 32 which has flanged ends 34 and 36. A plurality of rollers 38 are mounted within the drawn cup 32. The rollers are separated by pockets formed in retainer 40. The rollers 38 of the radial bearing run on heavy wall inner ring 31 which is slip fit on the shaft 10. The radial bearing is sealed at one end by means of annular seals 42.

Axial location and axial load components are anti-frictionized through the bi-directional thrust bearing assembly 46. The assembly 46 is pressed into the housing and is slip fit on the inner ring 31 and the shaft 10. The bi-directional thrust bearing assembly is axially locked on the shaft 10 by means of a tapered snap ring 48 located in the annular tapered groove 50 on shaft 10.

Figure 2:
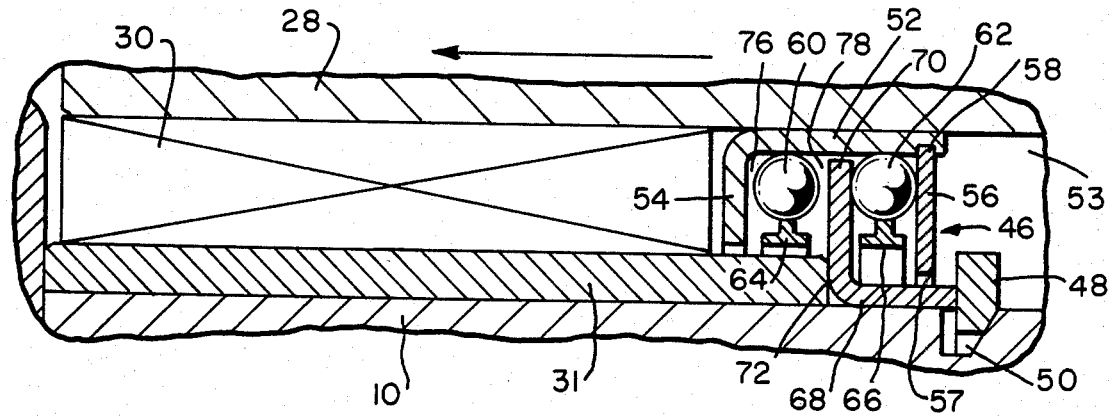
FIG. 2 is a sectional view, on an enlarged scale, of the radial and bi-directional thrust bearing of FIG. 1 showing the positions of the parts of the bearing when a thrust load is exerted to the left, looking at the figure.
Figure 3:
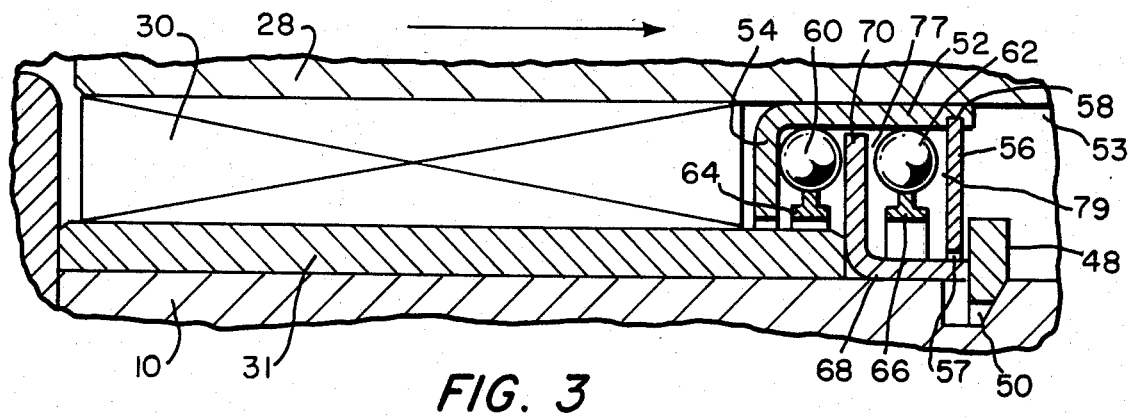
FIG. 3 is a view similar to FIG. 2 showing the positions of the parts of the bearing when a thrust is exerted to the right, looking at the figure.

In the preferred embodiment shown in FIG. 2 and FIG. 3, the bi-directional thrust bearing arrangement 46 includes a metal cup 52 which is press fit into the bore 53. The metal cup 52 has a radially extending flange 54 at one end and an annular thrust washer 56 mounted in an annular groove 58 adjacent the other end. Thrust washer 56 extends radially across the bore 53. The diameter of the hole 57 in thrust washer 56 is less than the outside diameter of snap ring 48.

The bi-directional thrust ball bearing assembly also includes two axially spaced sets of balls 60 and 62. Balls 60 are retained in retainer 64; balls 62 are retained in retainer 66.

A thrust plate is also included as part of the bi-directional thrust ball bearing 46. The thrust plate includes an inner flange 68 and a radially extending annular race portion 70. The thrust plate is fixed in its axial position by the contact of the radially extending annular portion 70 at point 72 against the extreme end of inner ring 31 and the contact of the end surface 74 of inner flange 68 against the tapered snap ring 48.

The dimensions, that is, the length of the metal cup 52, the diameters of the balls 60 and 62, the thickness of the annular extending portion 70 of the thrust plate, and the thickness of thrust washer 56 are such that an axial force on the metal cup 52 will cause either the balls 60 or the balls 62 to be loose in the cup 52 depending upon the direction of the axial force.

As can be seen by looking at FIG. 2, an axial thrust load in the direction of the arrow moves thrust washer 56 into engagement with the balls 62 which in turn engage the annular radially extending portion 70 on the thrust plate. The thrust is carried through the balls 62 from the thrust washer 56, through the radially extending annular portion 70, and into the edge of inner ring 31. The balls 60 will then fit loosely within the metal cup 52 and clearances 76 and 78 will exist between the balls 60 and the flange 54, and the balls 60 and the annular radially extending portion 70 of the thrust plate, respectively. The clearances are exaggerated in the figure for clarity.

Looking at FIG. 3, an axial thrust in the direction of the arrow moves flange 54 into engagement with balls 60 which in turn engage the annular axially extending portion 70 of the thrust plate. The thrust is carried through the balls 60, the annular radially extending portion 70 of the thrust washer, the inner flange 68 of the thrust plate, and into the snap ring 48, and stationary shaft 10. The balls 62 will then fit loosely within the metal cup 52 and clearances 77 and 79 will exist between balls 62 and the annular radially extending portion 70 of the thrust plate, and the balls 62 and thrust washer 56, respectively. Axial movement is limited by contact of thrust washer 56 against snap ring 48.

In the preferred embodiment shown in FIG. 4 and FIG. 5, the slip on inner ring 90 has a longitudinal portion 92 of one outside diameter and a longitudinal portion 94 of lesser outside diameter interconnected by the shoulder 96. The outer race or cup 98, which in this embodiment is also pressed into the bore, has a radially extending flnage 100 at one end. The other end of the cup 98 is curled over at 102 to retain a thrust washer 104 which in turn axially retains a thrust plate 106. A second thrust plate 108 separated from thrust plate 106 by balls 10 is also mounted within the cup 98. The axial movement of the balls 110 and thrust plates 106 and 108 is limited in one axial direction by the plate retaining annular member 112 and limited in the other axial direction by shoulder 96 on inner ring 90. The thrust plate annular retaining member 112 is axially located between the inner ring 90 and the snap ring 48 and extends above the outside diameter of longitudinal portion 94 of inner ring 90.

The dimensions, that is, the length of the cup 98, the diameter of the balls 110, the thickness of thrust washer 104, and the thickness of each of the thrust plates 106 and 108 are such that an axial clearance will exist either between the annular flange 100 and thrust plate 108 or the thrust plate 106 and thrust washer 104 depending upon the direction of the axial force.

If not axial thrust is exerted against the cup 98, the plates 106, 108, and balls 110 fit loosely in the cup. As can be seen by looking at FIG. 4, an axial thrust load in the direction of the arrow moves the thrust washer 104 against the top of the thrust plate 106. A clearance 114 is then formed between the flange 100 of cup 98 and the thrust plate 108. The thrust is carried through thrust washer 104, thrust plate 106, balls 110, thrust plate 108, and into the shoulder 96 of the inner ring 90.

Looking at FIG. 5, an axial thrust in the direction of the arrow moves the cup flange 100 into engagement with the thrust plate 108. An axial clearance 116 then exists between the thrust plate 106 and annular thrust washer 104. Thrust is carried through the annular flange 100, thrust plate 108, balls 110, thrust plate 106, thrust plate retainer 112, annular snap ring 48 and into the stationary shaft 10.

I claim:

1. A radial bearing and bi-directional thrust bearing arrangement comprising: an inner-annular race; a rotatable outer member having an inside diameter larger than the outside diameter of the inner-annular race to provide an annular space; a radial roller bearing mounted in the annular space; a bi-directional ball bearing also mounted in the annular space, said ball bearing being slip fit on the inner-annular race and having a metal cup with a radially extending end flange, the metal cup securely engaging the rotatable outer member; a ball and thrust plate assembly having balls and at least one thrust plate the ball and thrust plate assembly fitting loosely in the metal cup when no axial force is exerted against the cup and an axial force on the metal cup in a predetermined axial direction causes the end flange, balls, and at least one thrust plate to come into contact to form a thrust path from the end flange through the ball and thrust plate assembly, and an axial force in the other axial direction causes the end flange to move away from such contact to break the thrust path.

2. A radial bearing and bi-directional thrust bearing arrangement in accordance with claim 1 wherein: the balls are axially located between the end flange and the thrust plate, an axial force on the metal cup in said predetermined axial direction causes the end flange to come into contact with the balls, and an axial force in the other axial direction causes the end flange to move away from the balls.

3. A radial bearing and bi-directional thrust bearing arrangement in accordance with claim 1 wherein: the thrust plate is axially located between the end flange and the balls, an axial force on the metal cup in said predetermined axial direction causes the end flange to come into contact with the thrust plate, and an axial force in the other axial direction causes the end flange to move away from the thrust plate.

4. A radial bearing and bi-directional thrust bearing arrangement comprising: an inner-annular race; a rotatable outer member having an inside diameter larger than the outside diameter of the inner-annular race to provide an annular space; a radial roller bearing mounted in the annular space; a bi-directional ball bearing also mounted in the annular space, said bi-directional ball bearing being slip fit on the inner-annular race and having a metal cup with a radially extending flange and a radially extending thrust washer mounted in the metal cup, two axially spaced sets of balls and an axially fixed thrust plate located within the metal cup with the fixed thrust plate extending between the two sets of balls, the metal cup securely engaging the rotatable outer member, the two axially spaced sets of balls fitting loosely in the metal cup when no axial force is exerted against the cup and an axial force on the metal cup in one direction causes the thrust washer to press one set of balls against the fixed thrust plate so that the other set of balls is loosely contained in the ball bearing, and an axial force in the other axial direction causes the metal cup end flange to press the other set of balls against the fixed thrust plate so the said one set of balls is loosely contained in the ball bearing.

5. A bi-directional thrust bearing arrangement comprising: an outer race having an end flange, a thrust washer mounted in the outer race and extending radially inwardly from the outer race; a ball and thrust plate assembly having balls and at least one thrust plate, the ball and thrust plate assembly fitting loosely in the outer race when no axial force is exerted against the outer race an axial force on the outer race in one axial direction causing the outer race end flange, to contact the balls and thrust plate assembly leaving an axial clearance between the ball and thrust plate assembly and the thrust washer and an axial force on the outer race in the other axial direction causing the thrust washer to contact the ball and thrust plate assembly leaving an axial clearance between the ball and thrust plate assembly and the outer race end flange.

6. A bi-directional thrust bearing arrangement in accordance with claim 5 wherein: there are two axially spaced sets of balls, a single thrust plate extends radially between the two sets of balls, and an axial force on the outer race in said one direction causes the outer race end flange to press one set of balls against the thrust plate so that the other set of balls is loosely contained in the ball bearing; and an axial force on the outer race in said other axial direction causes the thrust washer to press the other set of balls against the thrust plate so the said one set of balls is loosely contained in the ball bearing.

7. A bi-directional thrust bearing arrangement in accordance with claim 5 wherein: there are two radially extending thrust plates separated by a set of balls and an axial force on the outer race in said one direction causes the outer race end flange to contact one thrust plate and the thrust washer to separate from the other thrust plate, and an axial force on the outer race in said other direction causes the thrust washer to contact the other thrust plate and the outer race end flange to separate from said one thrust plate.

* * * * *